United States Patent
Sakatani et al.

(10) Patent No.: US 6,587,225 B1
(45) Date of Patent: Jul. 1, 2003

(54) IMAGE PROCESSING APPARATUS

(75) Inventors: Kazuomi Sakatani, Toyokawa (JP); Tetsuya Itoh, Okazaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/427,074

(22) Filed: Oct. 26, 1999

(30) Foreign Application Priority Data

Oct. 26, 1998 (JP) .......................................... 10-303752

(51) Int. Cl.⁷ .............................................. G06K 15/00
(52) U.S. Cl. ...................... 358/1.9; 358/509; 358/516; 358/520
(58) Field of Search ........................ 358/1.9, 504, 509, 358/516, 520

(56) References Cited

U.S. PATENT DOCUMENTS 6,064,433 A * 5/2000 Bush et al. ................ 348/364
6,091,827 A * 7/2000 Tanaka ...................... 381/306
6,115,146 A * 9/2000 Suzuki ...................... 358/474
6,226,040 B1 * 5/2001 Kuo ......................... 348/446
6,329,964 B1 * 12/2001 Tanaka ...................... 345/8
6,345,128 B1 * 2/2002 Stokes ....................... 382/254

FOREIGN PATENT DOCUMENTS

JP 08-116462 5/1996 ............ H04N/1/60

* cited by examiner

Primary Examiner—Jerome Grant, II
(74) Attorney, Agent, or Firm—Burns, Doane, Swecker & Mathis, LLP

(57) ABSTRACT

An image processing apparatus includes a brightness extracting element for extracting information relating to brightness from color image data; an image attribute judging element for judging a light-color image portion in a color image; and a brightness change section which changes brightness of the light-color image portion. The image attribute judging element includes a separating device for separating foreground data and background data from the color image data; and a comparing section which, when a difference in brightness between the foreground and the background separated by said separating device is smaller than a predetermined value, judges the foreground data as data of a light-color image portion.

9 Claims, 4 Drawing Sheets

IMAGE PROCESSING APPARATUS

BACKGROUND OF THE INVENTION

1. Field of the Invention

The present invention relates to an image processing apparatus for converting color image data into those corresponding to an image outputting apparatus.

2. Description of Related Art

Recently, color printers became popular with the debut of low-price ink jet printers, and the like. Due to rapidly widespread use of the Internet, it became possible to easily print a Web image such as a home page containing characters and photos and appearing on a monitor display, with a color printer.

When a Web image such as a home page on a monitor display is to be printed, it is desirable to compensate for insufficient functions of the browser used to obtain the image. Therefore, a printer driver software for the Internet additionally including functions such as automatic magnification, automatic page ejection, and multiple column setting has been developed. Such a driver controls a printer so as to faithfully print an image displayed on the monitor.

OBJECTS AND SUMMARY

A Web image in a home page or the like on the Internet sometimes includes characters having high brightness such as white or yellow which can be very easily identified in a background color on a monitor, particularly in the case where the home page is in its own color setting. On the monitor display, characters of high brightness such as white or yellow in the background of low brightness are very clearly viewed.

In the case where, for example, the home page is in its own color setting, if the Web image is directly printed out by a color printer or the like so as to be faithfully reproduced, only the character portion is printed out and the background color is not printed out onto a paper sheet. In such a case, the screen image on the monitor display can be easily recognized with a large difference in brightness from the background. In contrast, on a printed paper sheet, it is very difficult to recognize characters and small graphics with no difference in brightness from the background, because they have a small brightness difference. In the worst case, such characters and small graphics cannot be substantially identified.

Many techniques for converting colors have been hitherto proposed.

In an image processing apparatus disclosed in Japanese Patent Publication (Kokai) No. HEI9-219797, a plane region containing colors before conversion and configured by hue and chroma is adjusted in a range which does not overlap a region including specified colors. The region is subjected to color conversion into specified colors based on a conversion color code.

In an image processing apparatus disclosed in Japanese Patent Publication (Kokai) No. HEI9-331464, color information which is selected by the operator from registered color information is converted by using a hue conversion coefficient, and then stored in a hue data memory as a registered color.

However, these methods are ineffective for an achromatic color such as white. As for chromatic colors, color information in other image regions such as graphics or photographic regions may be disadvantageously changed. Accordingly, it is impossible to sufficiently use such color management functions.

It is an object of the invention to provide a color image processing apparatus in which the ease of reading of bright characters printed onto a paper sheet is improved.

According to the present invention, an image processing apparatus comprises brightness extracting means for extracting information relating to brightness from color image data; image attribute judging means for judging a light-color image portion in a color image; and a lightness change section which changes brightness of the light-color image portion. The image attribute judging means comprises separating means for separating foreground data and background data from the color image data; and a comparing section which, when a difference in brightness between the foreground and the background separated by said separating means is smaller than a predetermined value, judges the foreground data as data of a light-color image portion.

DETAILED DESCRIPTION OF THE PREFERRED EMBODIMENTS

Preferred embodiments of the invention are specifically described herein with reference to the accompanying drawings.

Web data are written in a language such as HTML into a home page or the like on the Internet. The attributes and layouts of character data, image data, and other data are described in the Web data. For example, the attribute of character data is constituted by information relating to the position in the home page, the size, the color, and the like. The character data are displayed on a monitor display or transferred to a printer in accordance with the attribute information. In a background portion of a home page in which characters and image data are placed, the own color setting for the home page is often performed. Usually, the color information of the background portion is not transferred to the printer, so that nothing is printed onto the paper sheet. Accordingly, character data which are displayed as hollow characters or yellow characters in the background color on the monitor display are transferred to the printer to be output in a condition where the characters cannot be substantially identified.

According to the present the invention, when a Web image is to be printed, the following calculation is conducted. In character data in the Web image, for example, a difference in brightness between the character data and a background portion of the character (data which are to be actually transferred to a printer) is calculated from brightness data L* after color space conversion. When the difference in brightness is equal to or smaller than a predetermined value, the brightness of the character data is changed. For example, the brightness of a character included in the Web image and having high brightness, such as a white character or a yellow character is lowered, or the brightness of an edge portion of the character is lowered (trimmed). Accordingly, the ease of reading of bright characters printed onto a paper sheet is improved, and characters with high brightness on the monitor display can be clearly identified also on the printed paper sheet.

Figure 1:
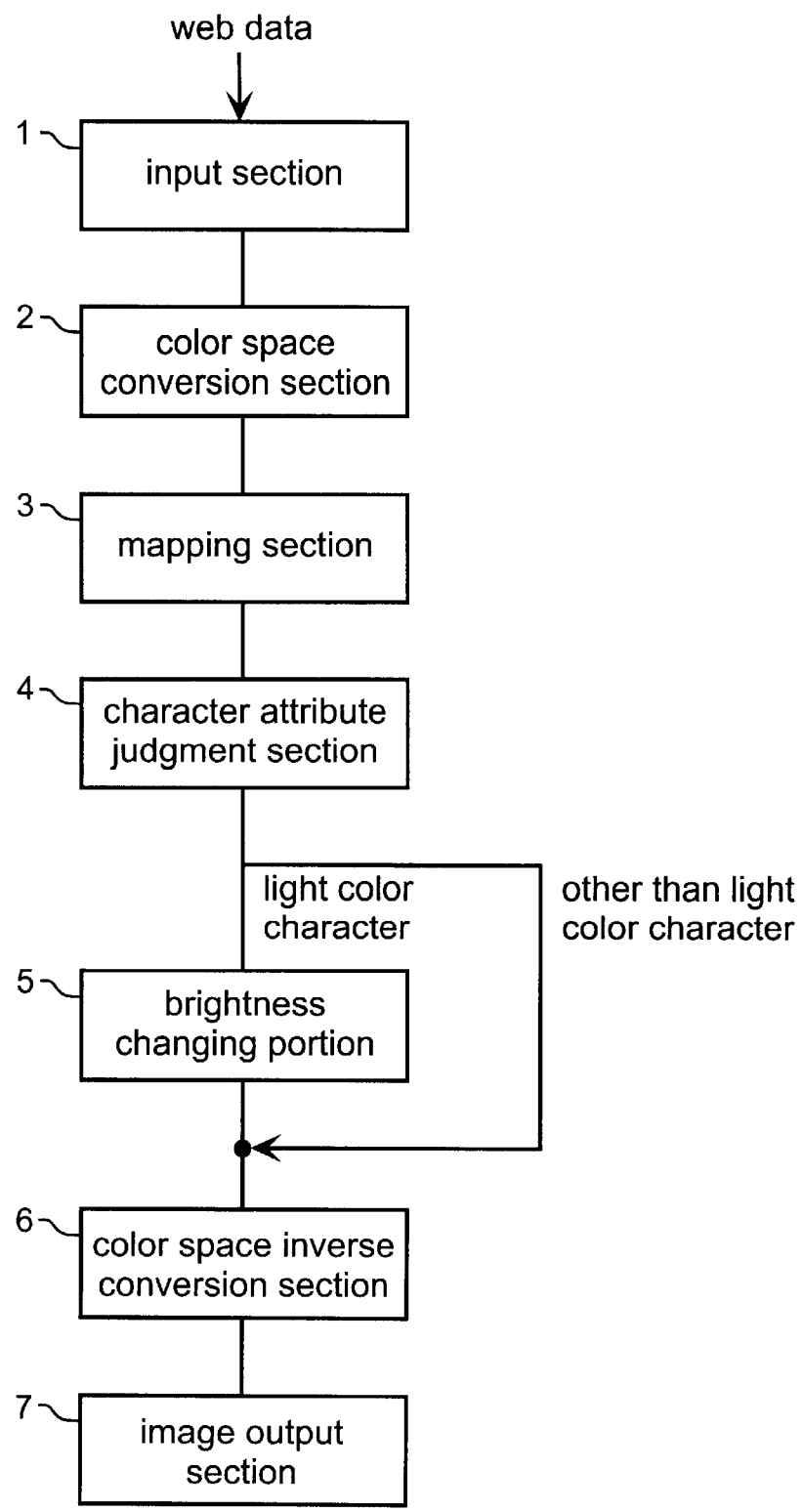
FIG. 1 is a block diagram of an image processing apparatus of a first preferred Embodiment of the invention.

FIG. 1 schematically shows the flow of image information in an embodiment of the invention. As shown in FIG. 1, when Web data in the Internet are to be converted into output data corresponding to an image output section 7, preparation before the data transfer to the printer is performed in the following manner. The attribute of the character data after mapping to an optimum color region for the image output section 7 is judged. In the case where the difference in brightness between the character data which are to be actually transferred to the printer) and the background portion is equal to or smaller than a predetermined value, the brightness of the character data or that of an edge portion of the character is changed, and the changed data are transferred to the image output section 7. In the image processing apparatus, the brightness of character data can be changed in accordance with input Web data. As a result, even when the Web image in which the brightness of light color character data is changed is output onto a paper sheet by a color printer or the like, the image can be output as characters which can be relatively easily identified, without affecting other images.

More specifically, in the image processing apparatus, when an input section 1 receives Web data, a color space conversion section 2 generates color space data for obtaining information relating to brightness from the Web data. That is, in the color space conversion section 2, for example, the color information of the Web data is converted into an image signal L* relating to the brightness of a CIE uniform color space or the like, and image signals a* and b* relating to colors. Thus, the color information of the Web data is separated into brightness information and chromaticity information. In this way, information relating to the brightness (brightness information) is extracted from the color image data.

Next, in a mapping section 3, the converted color space signals are mapped onto a color region corresponding to the image output section 7. At this time, foreground data and background data are separated from the color image data. In a character attribute judgment section 4, a difference in brightness between character data (foreground) and the background portion is calculated from the image signal L* relating to the brightness after the mapping, so as to judge the image attribute of the character data.

Next, if the character data are judged as light color character data (in the case where the difference in brightness between the foreground and the background is small), a brightness change section 5 changes the image signal relating to the brightness of the character data, so as to lower the brightness of the character with high brightness. Alternatively, the image signal relating to the brightness of the edge portion is changed, so as to lower the brightness of the edge portion (i.e., to perform the trimming).

In a color space inverse conversion section 6, the color space signal containing the character data in which the image signal relating to the brightness is changed is inversely converted into the original image format, and then transferred to the image output section 7.

In the color space conversion section 2, for the purpose of color matching or the like, color information of R, G, and B, and the like in the character and image data are converted into, for example, L*, a*, and b* data (brightness and chromaticity information) of the uniform color space. The converting method may be realized by a nonlinear operation (2), after the color information is converted into a color system such as X, Y, and Z by a matrix operation such as 3*3 represented by the following expression (1). Alternatively, the converting method may be realized by a method using a matrix operation of higher order, a look-up table, or the like.

Expression 1:

$$\begin{pmatrix} X \\ Y \\ Z \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix} \quad (1)$$

The converted XYZ data are further converted into L*a*b* data defined in CIE 1976, by using the nonlinear operation represented by the following expression (in the case where conditions of X/Xo, Y/Yo, and Z/Zo>0.008856 are satisfied).

Expression 2

$$L^* = 116(Y/Yo)^{1/3} - 16$$
$$a^* = 500\{(X/Xo)^{1/3} - (Y/Yo)^{1/3}\} \quad (2)$$
$$b^* = 200\{(Y/Yo)^{1/3} - (Z/Zo)^{1/3}\}$$

where Xo, Yo, and Zo are tristimulus values in the XYZ system in a perfect reflecting diffuser. The description for the case where the conditions of X/Xo, Y/Yo, and Z/Zo<0.008856 are satisfied is omitted. It should be understood that, even if X, Y, and Z remain unconverted, the luminance information Y may be representatively used as the information relating to the brightness. Alternatively, another color system consisting of, for example, Y, Cr, and Cb may be used.

In the mapping section 3, the color space signal which has been converted in the color space conversion section 2 is further converted into a color region corresponding to the image output section 7. Generally, monitor signals for a CRT or the like are RGB signals, and signals which are to be output by a printer are CMYK signals, so that reproducing ranges of a monitor display and a printer are inevitably different from each other. For this reason, it is difficult to faithfully output all colors on the monitor display by using the printer. Therefore, it is desirable to optimally adjust the color reproducing region. Although description of the details is omitted, there are techniques in which an average color difference is minimized, and in which a color difference in so-called stored colors such as a skin color and a sky color is reduced, and other techniques. In addition, some algorithms such as a linear interpolating method and a nonlinear interpolating method have been proposed. Alternatively, in a method using a color management function, RGB signals displayed on a monitor display are converted into XYZ signals in accordance with profile information of the monitor display, and the signals are further converted into CMYK signals in accordance with profile information of a printer. Even if the Y (luminance) signal of the XYZ signals in the series of processing is used as brightness information for the character attribute judgment section 4 in the succeeding processing, there arises no problem.

Figure 2:
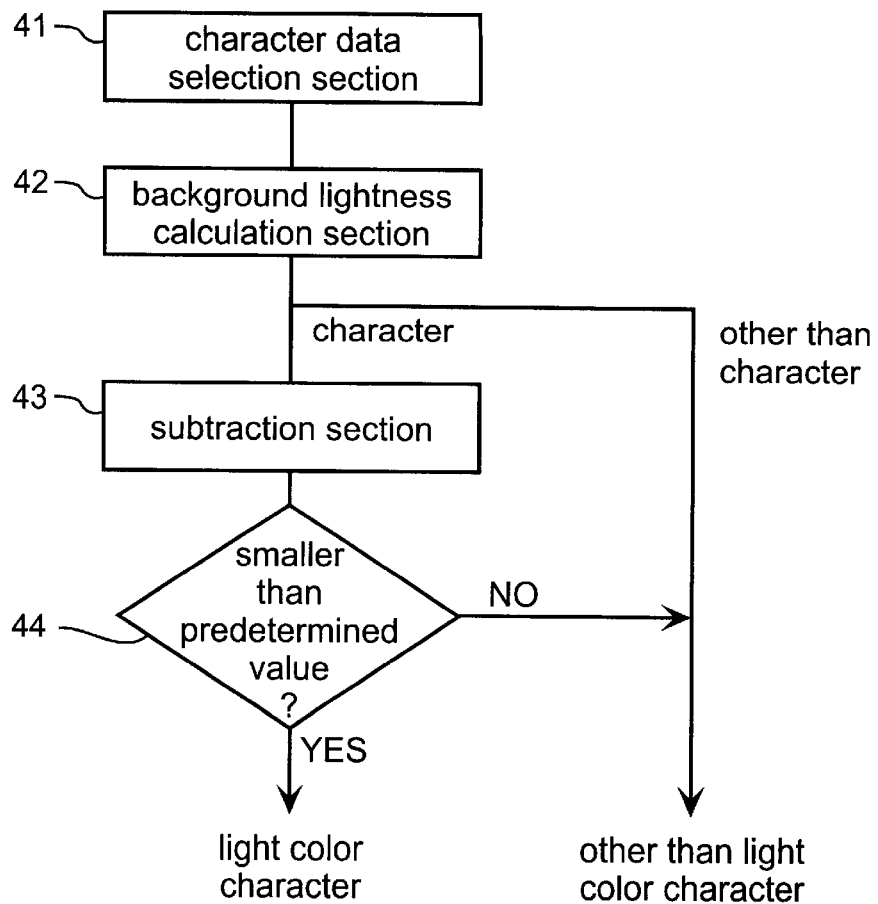
FIG. 2 is a block diagram of a character attribute judgment section.

FIG. 2 is a flowchart showing the processing of the character attribute judgment section 4. In the character attribute judgment section 4, a character data selection section 41 selects only character data. That is, only font data which are included in the Web data 1 of the page to be printed and encoded at the opening are selected. This selection can be easily realized. Next, for the font data selected by the character data selection section 41, a background brightness calculation section 42 calculates brightness information of data which are in a background portion where the font data are placed, and which is to be actually transferred to the printer. A subtraction section 43 subtracts the brightness of the font data selected by the character data selection section 41, from that of the background of the character calculated by the background brightness calculation section 42, to obtain a difference therebetween. If the subtraction result is smaller than a predetermined value, a comparison section 44 judges the character as a light color character, and outputs the judgment. In the case of the brightness (0 to 100), for example, the value may be a number which is equal to or smaller than about 10. In the case of using the luminance Y (0 to 100), the value may be set to a number of about 20 as a guide. If the result exceeds the predetermined value, the data are judged as data other than a light color character, and the judgment is output.

Figure 3:
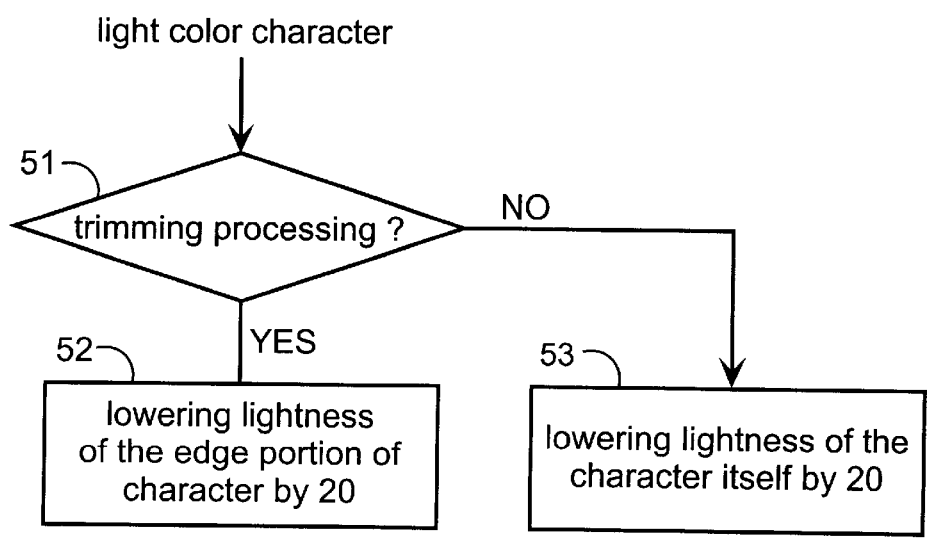
FIG. 3 is a block diagram of a lightness change section.

FIG. 3 shows data processing in the brightness change section 5. The processing of changing the brightness is performed on the font data which have been judged as a light color character by the character attribute judgment section 4. If it is judged in a judgment section 51 that the trimming processing is not performed, a first process section 53 performs processing of lowering the brightness of the character itself of the font data which have been judged as a light color character by the character attribute judgment section 4. If the trimming processing is to be performed, a second process section 52 performs processing of lowering the brightness of the edge portion of the character (i.e., the trimming processing).

Alternatively, the user may select which processing is performed, or that the processing itself is not performed. If the brightness of the character data to be processed is lowered by about 10 to 20 (in the case of the trimming processing, the brightness may be further lowered), the character is remarkably easily identified. Alternatively, the user may specify the amount of the brightness to be lowered (in this example, 20).

The color space inverse conversion section 6 inversely converts the color space information of the Web data including the font data in which the brightness has been changed, into the data format for transfer to the printer. In the case of the inverse conversion to the RGB signals, for example, the calculation processing is performed in the manner opposite to that performed in the color space conversion section 2.

The data which have been inversely converted are transferred to the image output section 7, and then converted into the CMYK data via halftone processing (not shown) and the like. Thereafter, the data are printed onto a paper sheet.

Embodiment 2

Figure 4:
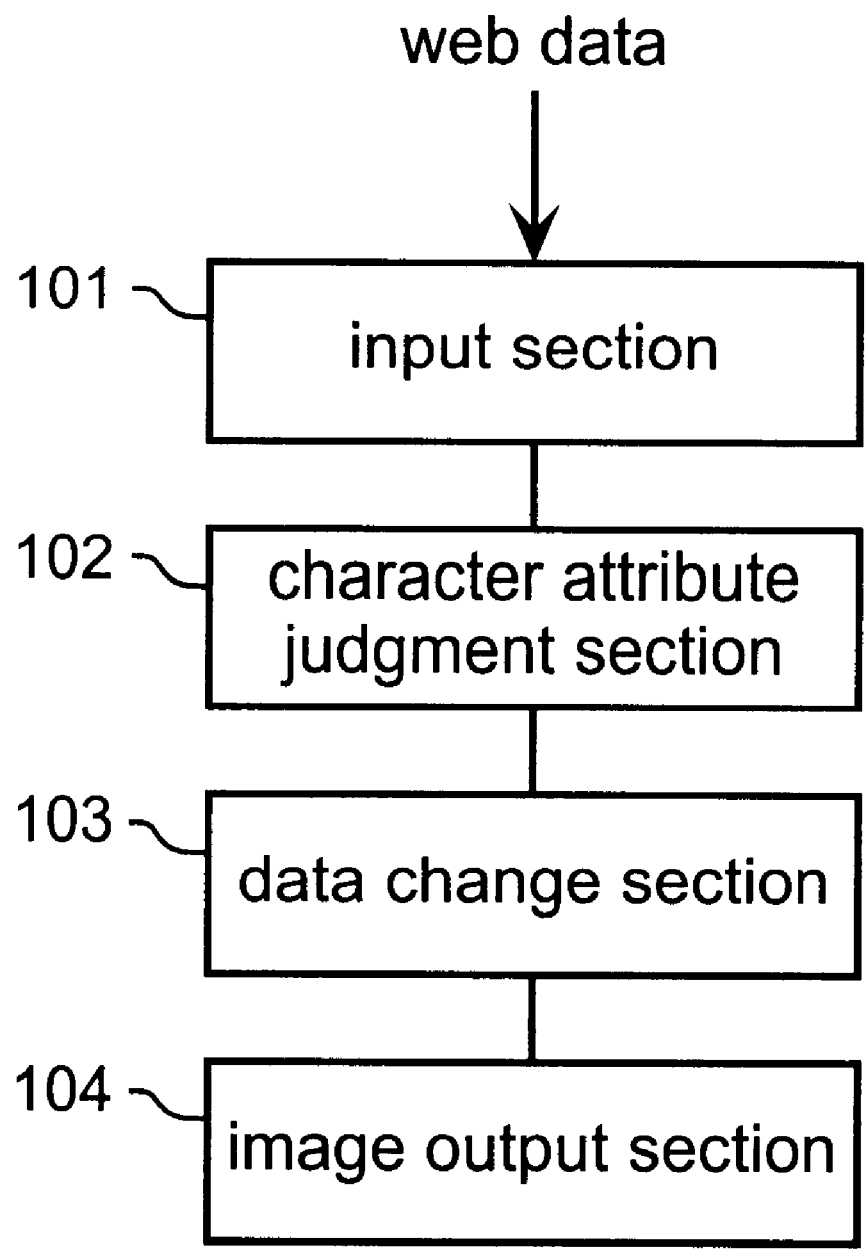
FIG. 4 is a block diagram of an image processing apparatus of a second preferred Embodiment of the invention.

An image processing apparatus of another embodiment of the invention and corresponding to the case where the processing such as color matching is not performed will be described. FIG. 4 schematically shows the flow of image information in the image processing apparatus. In the image processing apparatus, a character attribute judgment section 102 calculates a difference in brightness between font data and the background portion thereof from Web data input from an input section 101, and judges whether the font data are light color character data or not, i.e., the attribute of the character.

A data change section 103 changes an image signal of the font data judged as a light color character or an image signal of the edge portion thereof, and transmits the changed data to an image output section 104. The data other than the light color character data are directly transmitted to the image output section 104. In this way, the image signal of the font data can be changed correspondingly to the input Web data. Based on the font data included in the Web data and the color information of the background portion thereof, the color information of the font data actually transferred to the printer, is changed. Even if font information of light color is placed in the light background is transferred to the printer, the characters can be identified. Without affecting photo data and other data, the monitor image can be optimally reproduced.

Figure 5:
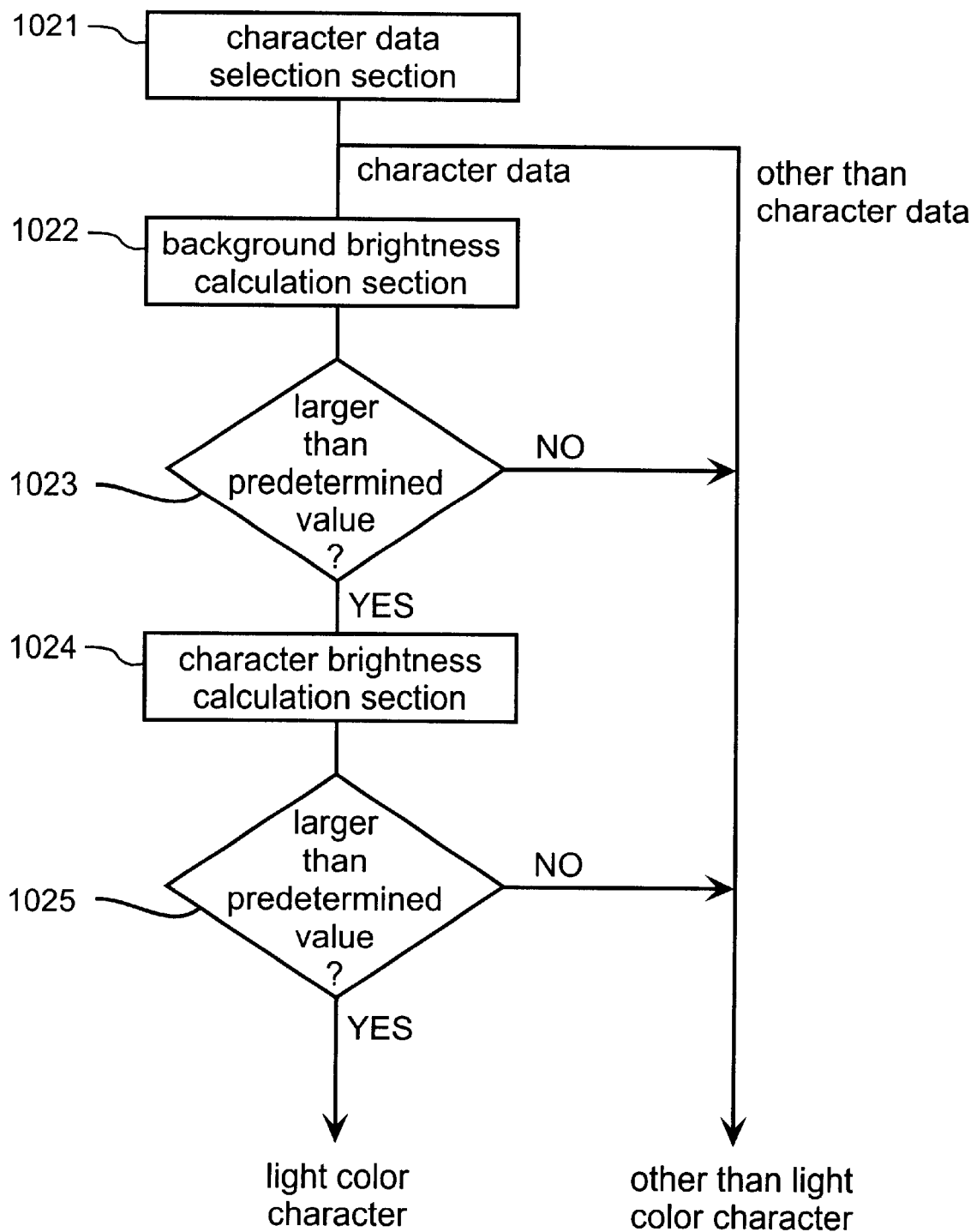
FIG. 5 is a block diagram of a character attribute judgment section.

FIG. 5 shows a judging method of the character attribute judgment section 102 shown in FIG. 4. In the character attribute judgment section 102, only character data are selected by a character data selection section 1021. That is, it is required to select only font data included in the Web data of a page which is to be printed and encoded at the opening. This selection can be easily realized.

Next, for the font data selected by the character data selection section 1021, a background brightness calculation section 1022 calculates brightness information of background of the data which are in a background portion where the font data are placed, and which is to be actually transferred to the printer. Generally, most background data transferred to a printer have values of R=G=B=255 (white). As an index for determining that the background is bright, for example, conditions of R and G>240 are set. As a result, light gray and yellow can be detected. If a first judgment section 1023 judges that the background calculated by the background brightness calculation section 1022 is a bright background, a character brightness calculation section 1024 calculates the brightness of the font data selected by the character data selection section 1021. If a second judgment section 1025 judges that the character calculated by the character brightness calculation section 1024 is a bright character, the character attribute is a light color character. Similarly to the case of the background, for example, if conditions of R and G>240 are set, characters of white, light gray, and yellow can be detected. That is, if the color information transferred to the printer satisfies the conditions of R and G>240 for both of the character portion and the background portion, it is judged that the data are light color characters. In the other cases, the data indicate a character attribute other than a light color character.

The data change section 103 performs the processing for changing color data of the character itself of the font data which have been judged as a light color character by the character attribute judgment section 102, or for changing color data of the edge portion of the character (trimming). Alternatively, the user may select which processing is performed, or that the processing itself is not performed. If all of the R, G, and B signals are lowered by about 10 to 20 from the color data of the character data to be processed (in the case of the trimming processing, a lower value may be set), the character can be remarkably easily identified. Alternatively, the user may specify the amount of the color data to be lowered.

The data including the changed color data are transferred to the image output section 104 to be converted into CMYK data via halftone processing (not shown). Thereafter, the data are printed onto a paper sheet.

In the image processing apparatus according to the present invention, a light-color image portion (a light color character, a small graphic, or the like on a bright background) is judged from input color image data, and the brightness of the light-color image portion is changed. Thus, the light-color image can be output so as to be clearly identified onto a paper sheet.

For example, a light-color image portion is judged based on a difference in brightness between foreground data and background data in the color image data. Thus, it is possible to separate the light-color image portion in the bright background as a foreground.

The brightness information is extracted from the color image data after color compression for image output. Based on the color information which is to be actually transferred to a printer, therefore, the color information of the font data can be changed.

When data are to be printed onto a paper sheet by a printer, image processing for changing the brightness of the whole of a character (font) with high brightness such as yellow, a small graphic (including characters), and the like is performed, so that the data can be clearly identified on the printed paper sheet.

When data are to be printed onto a paper sheet by a printer, image processing for trimming a character (font) with high lightness such as yellow, a small graphic (including characters), and the like is performed, so that the data can be clearly identified on the printed paper sheet.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed:

1. An image processing apparatus comprising:

brightness extracting means for extracting information relating to brightness from color image data;

image attribute judging means for judging a light-color image portion in a color image; and a brightness change section which changes brightness of the light-color image portion, wherein said image attribute judging means comprises:
   separating means for separating foreground data and background data from the color image data; and
   a comparing section which, when a difference in brightness between the foreground and the background separated by said separating means is smaller than a predetermined value, judges the foreground data as data of a light-color image portion.

2. The image processing apparatus according to claim 1, wherein said brightness extracting means extracts brightness information from the color image data after color compression.

3. The image processing apparatus according to claim 2, wherein said brightness change section changes the brightness of the whole image portion which is judged as a light-color image portion by said image attribute judging means.

4. The image processing apparatus according to claim 1, wherein said brightness change section changes the brightness of the whole image portion which is judged as a light-color image portion by said image attribute judging means.

5. The image processing apparatus according to claim 2, wherein said brightness change section changes the brightness of the whole image portion which is judged as a light-color image portion by said image attribute judging means.

6. The image processing apparatus according to claim 5, wherein the foreground data are character data.

7. The image processing apparatus according to claim 1, wherein the foreground data are character data.

8. An image processing apparatus comprising:

receiving means for receiving color image data;

first detecting means for detecting brightness of a character portion of the color image data;

second detecting means for detecting brightness of a background portion of the color image data; and changing means for changing the brightness of a character portion of the color image data based on result.

9. The image processing apparatus according to claim 8, wherein the changing means changes the brightness of the character portion of the color image data if a difference between the brightness of the character portion and the brightness of the background portion is within a predetermined value.

* * * * *